March 12, 1957  M. H. GRAHAM  2,784,678
COFFEE MAKER

Filed July 14, 1953  2 Sheets-Sheet 1

INVENTOR
Maurice H. Graham
BY Parry and Fiess
ATTORNEY

March 12, 1957 M. H. GRAHAM 2,784,678
COFFEE MAKER
Filed July 14, 1953 2 Sheets-Sheet 2
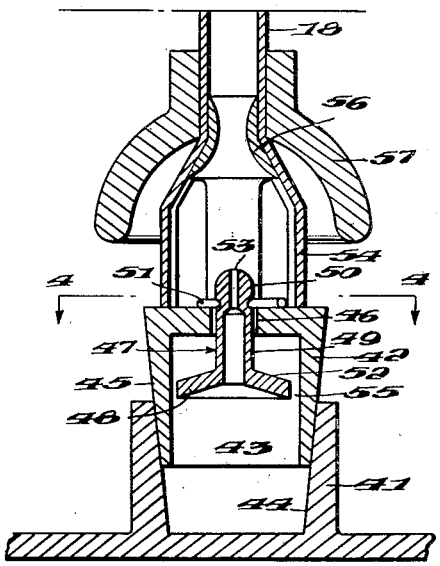
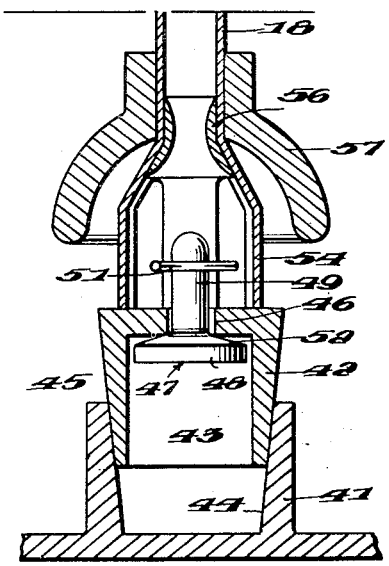
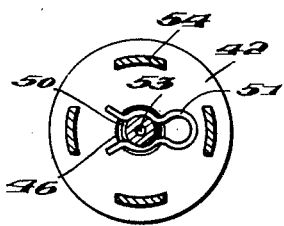
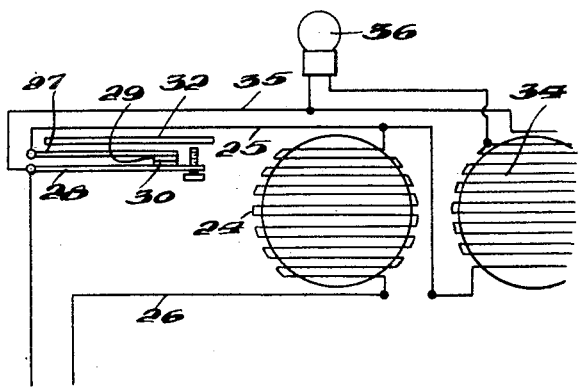
INVENTOR
Maurice H. Graham
BY Parry and Fiese
ATTORNEY United States Patent Office 2,784,678
Patented Mar. 12, 1957

2,784,678

COFFEE MAKER

Maurice H. Graham, Hopkins, Minn.; Maurice W. Graham and Northwestern National Bank of Minneapolis, Hennepin County, Minn., executors of said Maurice H. Graham, deceased.

Application July 14, 1953, Serial No. 367,827

7 Claims. (Cl. 103—231.5)

This invention relates to coffee makers of the type wherein the liquid to be infused is repeatedly circulated through a bed of coffee grounds and it is particularly directed to such general type of coffee maker having an improved novel liquid circulating mechanism involving steam injection which is extremely simple.

One object of the invention is to effect coffee infusion while the main body of the liquid to be infused is below boiling temperature by repeatedly isolating small quantities of liquid obtained from such body, converting the same into steam under pressure and employing the steam in jet form to circulate liquid from the main body through coffee grounds.

Another object of the invention is to provide a steam generating chamber having an opening through which liquid is admitted to the steam chamber and valve means to seal the opening and close the steam chamber upon the generation of steam. The valve means includes an orifice which also serves to admit liquid to the steam generating chamber simultaneously with the inflow of liquid through the aforementioned opening, and upon the generation of the steam and the closing of the opening, the orifice serves to provide a steam jet for injecting steam from the chamber into the liquid body to effect circulation of the liquid through the coffee grounds.

Another object is to circulate liquid to be infused by intermittently injecting steam from a steam generating chamber through a jet orifice into the liquid, and between the steam discharges from such chamber to supply small quantities of such liquid to the chamber for conversion into steam, the liquid entering the steam generating chamber serving to condense the steam remaining therein to promote the intake of liquid into the steam chamber following each steam discharge.

Another object of the invention is to effect a continuous circulation of liquid to be infused through coffee grounds by intermittent steam injection.

An alternative object of the invention is to effect intermittent circulation of liquid to be infused through coffee grounds by intermittent steam injection.

Another object of the invention is to repeatedly circulate liquid to be infused through coffee by steam injection until infusion of the desired strength has been attained and to automatically terminate steam generation by a timing mechanism.

The invention will be readily understood by reference to the accompanying drawings and the detailed description to follow. In such drawings:

Fig. 2 is a fragmentary enlarged sectional elevation of the circulating mechanism shown in Fig. 1;

Fig. 3 is a view similar to Fig. 2 showing the circulating mechanism in another of its operative positions;

Fig. 4 is a sectional view taken on the line 4—4 in Fig. 2; and

Fig. 5 is a diagrammatic view of the heating and control electric circuit.

Figure 1:
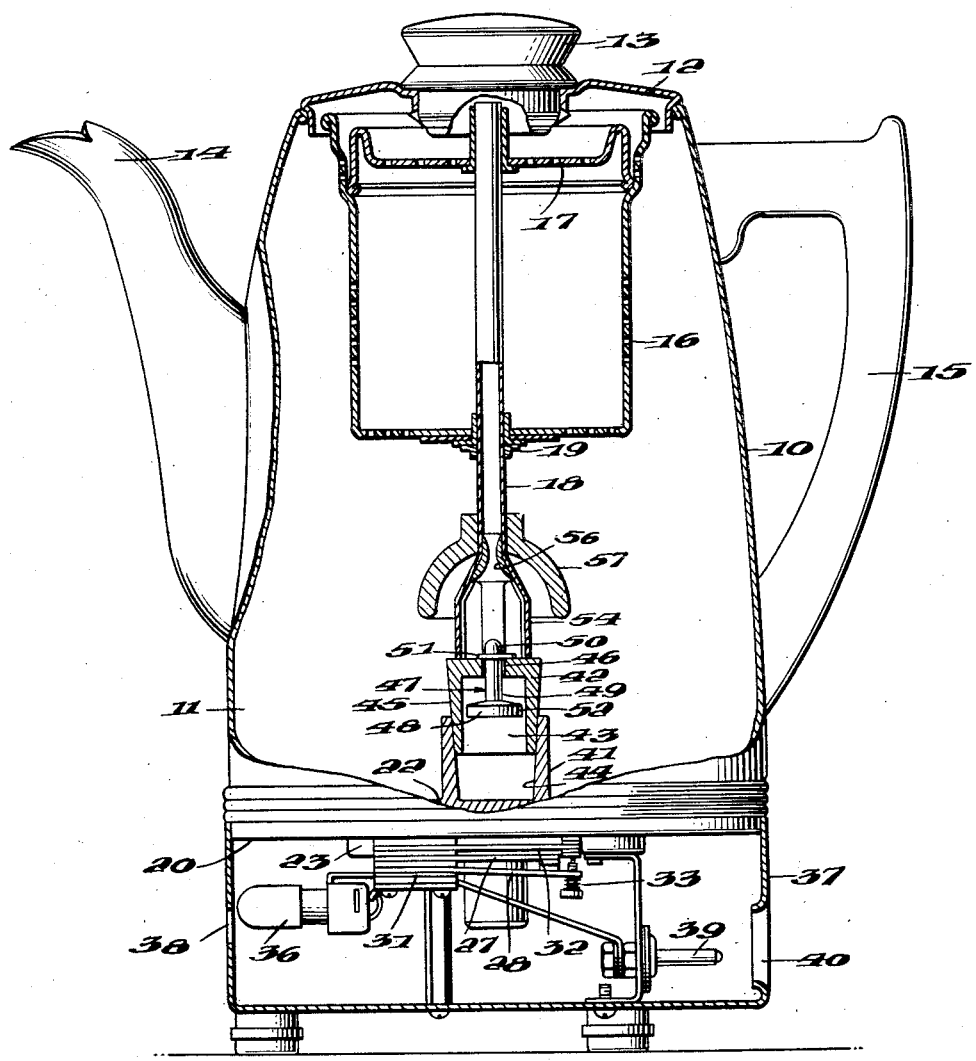
Fig. 1 is a side view, partly in elevation and partly in section, illustrating a coffee maker embodying my invention.

Referring to Fig. 1, there is shown a coffee making vessel 10 which may be made in conventional form and composed of stainless steel or other metal or glass. Interiorly of the vessel is a chamber 11 for holding the liquid to be infused. A removable top 12 closes the upper end of the vessel. Secured centrally of the top is a hollow liquid spreading cap 13, preferably made of glass. A pouring spout 14 and handle 15 are provided on opposite sides of the vessel.

A perforate coffee holder 16 having a removable perforate top 17 is located in the upper portion of vessel 10 above the top level of the liquid in chamber 11. Extending upwardly through the coffee holder and upwardly into cap 13 is a fountain tube 18 for circulating liquid from the chamber 11 through coffee in the coffee holder, from which it recirculates back to chamber 11. A flanged sleeve 19 secured to tube 18 provides a seat upon which the coffee holder is removably supported.

The bottom of the vessel includes an annular portion 20 which surrounds a metal heating plate 22, preferably of iron. A similar lower plate 23 is bolted to the upper plate, the same being shown projecting below the plane of annular bottom portion 20 in Fig. 1. Sandwiched between plates 22 and 23 and insulated therefrom by mica (not shown) is a flat heating element 24. As shown in Fig. 5 the same comprises a coil of electrical resistance wire wound on a flat disc of mica or other suitable insulating material. The heating element connects with electric lines 25 and 26. An automatic timing device is provided to terminate circulation of liquid at the end of a predetermined brewing period. This is of a thermostatic switch type. As shown in Figs. 1 and 5 the same comprises a pair of spring metal switch arms 27 and 28 having normally closed contacts 29 and 30 and supported by an insulating mounting 31 in the form of a series of washers. Such mounting is secured to the underside of annual vessel bottom portion 20. Secured by mounting 31 in spaced proximate relation to the bottom portion is a bimetal thermostatic arm 32 responsive to the heat of the liquid in chamber 11. An adjustable actuating screw 33 is threaded to an extension of switch arm 28. The bimetal arm is arranged to warp downwardly in response to heating and at a temperature determined by the setting of screw 33 will depress switch arm 28 and open switch contacts 29 and 30.

An electrical resistance element 34 is connected to electric line 25 through line 35 to switch arm 27. The same is conveniently of the same wound disc form as heating element 24 and the same can be sandwiched between plates 22 and 23 with mica insulating it from the underside of the heating element. When switch contacts 29 and 30 are closed during the brewing period resistance 34 is shunted out of the circuit and full current is supplied to heating element 24. When the contacts are opened at the end of the brewing period by bimetal arm 32 resistance 34 is thrown in series with the heating element so that a lower amount of heat is supplied to keep the brew at a suitable drinking temperature sufficiently high to cause the bimetal arm to maintain the switch contacts open. The stand-by heating temperature will be sufficiently high to prevent resumed circulation of the brew through the coffee bed by the circulating mechanism hereafter to be described. If the arrangement were such that heating was discontinued at the end of the brewing period the bottom of the vessel and the brew would cool sufficiently to cause the bimetal arm to close the switch contacts, resulting in the supply of full current to the heating element. By way of example, the heating element 24 may be of 400 wattage and resistance 34 of an ohmage to reduce it to 65 wattage.

An electrical signal light 36 is provided to indicate the end of the brewing period. The same can be supported by any suitable bracket beneath bottom portion 20 of the vessel. Such light and the termostatic timing switch are mounted interiorly of a hollow vessel base 37. A viewing port 38 is provided in the side wall of the base. The signal light may comprise a low voltage lamp. The same may be connected in the circuit to be lighted during the brewing period and to cut off the signal the end of such period. Alternately, and as shown in Fig. 5, the light is connected so as to be inoperative during the brewing period. The same is shown in shunt with a few of the coils of electric resistance element 34 so as to be energized when the bimetal arm opens the switch contacts to throw the resistance element into circuit with heating element 24.

Also mounted in hollow base 37 are a pair of electric terminal pins 39, one of which is seen in Fig. 1. Such pins are supported by any suitable form of bracket. An opening 40 in the side of the base permits a conventional plug from an electric cord to be connected to the pins.

As previously explained, circulation of liquid to be infused through the coffee grounds in holder 16 is effected by steam injection. A novel steam generating and injecting device is provided. The same includes a small metal lower well portion 41 on the upper side of heating plate 22 and projecting upwardly into liquid chamber 11. An upper well portion 42 seats in the lower well portion 41 and together form the steam generating chamber 43 to which steam generating heat is applied through metal heating plate 22. The inner wall 44 of the lower well portion 41 and the outer wall 45 of the upper well portion 42 are each beveled to form mating parts, whereby the upper well portion seats in the lower well portion and there is provided a water tight seal between the two parts, and further serves to rigidly support the fountain tube 18 and associated parts as will be described hereafter.

The steam generating chamber 43 is provided with an opening 46 centrally located in the top of the upper well portion 42. Loosely mounted in the opening 46 is a valve 47, comprising a base 48 and an upstanding hollow stem 49, the whole being adapted to reciprocate in the opening 46, for a purpose to be described. Adjacent the end of the stem there is formed a peripheral groove 50 providing a seat for a spring pin 51 which retains the valve in the upper well portion 42, and with the base 48 limits the extent of movement thereof. The diameter of the stem 49 is slightly less than the diameter of the opening to provide an annular opening in the top of the steam chamber and allowing the requisite freedom of movement of the valve 47 relatively to the upper well portion 42 of the steam chamber 43. The base 48 of the valve 40 is in the form of a cone, directed toward the stem 49 and presenting an inclined seat 52 facing the opening 46, so that upon upward movement of the valve 49 the inclined seat 52 will move into the opening 46 and seat therein to close the steam chamber, as illustrated in Fig. 3.

As will be more fully explained below, water filling the steam chamber 43 is quickly converted into steam, the pressure of which impinges on the underside of the base 48 and forces the valve 47 upwards with sufficient impact that the inclined seat 52 of the base 48 securely seats itself in the opening 46. This closes the steam chamber 43. However, the stem 49 is hollow for the greater part of its length and is formed with a pinhole orifice 53 in its end. The steam in the steam chamber 43 being under a substantial amount of pressure will leave the steam chamber through the hollow stem, and the orifice will convert the steam into a steam jet directed upwardly in the tube 18 for drawing the liquid up the fountain tube from the liquid chamber for infusion. To achieve this operation the tube 18 is aligned with the opening 46, and the orifice 53, and the bottom of the tube 18 is mounted on and secured to the upper well portion as by soldering or the like. The lower portion of the tube 18 adjoining the upper well portion 42 flairs outwardly and is formed with a plurality of spaced legs 54. Thus communication is provided with the liquid chamber 11 for the steam chamber 43 and for the tube 18. At the proper time in the coffee making operation liquid from the liquid chamber can enter the steam generating chamber, and at a subsequent step the liquid can be drawn up the tube 18 from the liquid chamber by the steam jet that is directed up into the tube by the orifice 53.

Lower well portion 41 and upper well portion 42 are so small that the steam generating chamber which they form will accommodate only a small quantity of liquid at one time. Preferably only from a teaspoon to a tablespoon of liquid will be received to be quickly converted into steam. The size of the annular opening 46 and the orifice 53 will primarily determine the amount of liquid entering the steam chamber. In a preferred embodiment the stem 49 of the valve 47 is about one-quarter of an inch in diameter with from .013 to .020 inch clearance around the stem between it and the opening 46. The orifice 53 is of pinhole size, being of the order of .031 inch in diameter. These dimensions are subject to variation, and are merely illustrative.

The operation will now be explained. The vessel 10 is filled with water until the liquid level at least reaches the fountain tube 18, completely immersing the legs 54 of the tube and covering the bottom of the tube. If the liquid level is too low proper operation will not be obtained. Water from the liquid chamber 11 will flow in between spaced legs 54 over the top of the upper well portion 42 of the stream generating chamber 43. At the initial stage while everything is cold the valve 47 will be in its lowermost position illustrated in Fig. 2. Accordingly, the steam generating chamber 43 will be open and liquid will flow in through opening 46 to fill the chamber. Some liquid also enters through the orifice 53, but because the annular opening 46 is so much larger than the orifice 53, the greatest portion of the liquid filling the steam chamber 53 will enter through the annular opening. Electric current is then supplied to the heating element 24 to start the coffee making operation.

Up to a temperature of about 160° F. of the liquid in the main chamber and on top of the upper well portion 42, no circulation of the liquid up through the fountain tube 18 is obtained. During the preliminary heat up period, because of the small size of the lower well portion 41 of the steam generating chamber 43 and the concentrated heat in the bottom of the chamber, steam begins to form therein. The steam formed at this point in the operation heats the remaining liquid in the steam chamber as well as the chamber itself. After sufficient heating a point is reached at which a sufficient amount of steam is generated in the chamber 43 to provide pressure in the chamber to impinge on the underside of the base 48 of the valve 47. This will cause the valve 47 to reciprocate upwardly to seat the conical portion 52 in the opening 46 to close the steam chamber, as illustrated in Fig. 3. The steam will now begin to leave the steam generating chamber 43 through orifice 53 under a small amount of pressure. This steam will come in contact with the relatively cooler liquid of the liquid chamber 11 and will quickly condense serving merely to augment the heating of the main body of liquid. This reduces the pressure in the steam chamber sufficiently that the valve 47 will drop down therein and return to the position illustrated in Fig. 2, whereupon liquid will again enter the chamber through opening 46. The first drops of liquid entering the steam chamber will condense the steam remaining therein momentarily creating a slight vacuum to promote the inflow of liquid by a suction action. This action will continue until the liquid in the liquid chamber 11 reaches a temperature of about 160° F. at which time the system is hot enough to begin the actual coffee making operation.

The construction and operation of the valve 47 have been generally described. The valve is the heart of the novel coffee maker and the successful preparation of the coffee depends on the operation of this part during the infusion of the liquid, and it will now be described with reference to its operation during this stage. Referring to Fig. 2 the valve 47 is shown in its lowermost position with the annular opening 46 open to admit liquid to the steam generating chamber 43. The steam chamber 43 communicates with the liquid chamber 11 through opening 46 and the spaces between the fountain tube supporting legs 54. The concentrated heat in the lower well portion 41 causes the liquid in the steam chamber to be quickly converted into steam with a substantial amount of pressure. The steam pressure impinges on the underside of the base 48 of the valve 47. Since the base has a relatively large area, there will be a considerable force acting on the valve to push it upward. In fact, the upward movement of the valve is sudden so that the base of the valve meets the top of the upper well portion 42 with an impact, coming to rest in the position shown in Fig. 3. Referring again to Fig. 2 it is seen that the base 48 of the valve has an area almost equaling that of the upper well portion 42, so that the steam generating chamber is in effect divided into two subsidiary chambers connected by the annular space 55. Thus the liquid below the base of the valve will be converted into steam more quickly than that above the base. But the build-up of steam pressure below the base is great enough to suddenly start the valve upwards as described above, forcing the unevaporated liquid remaining on the top of the valve base to flow to the bottom of the chamber 43 to be immediately converted into steam. Since the valve hits the top of the steam chamber with an impact, any remaining drops of liquid will be shaken off into the lower part of the steam chamber 43 and quickly converted into steam. The conical upper surface 52 of the valve base 48 contributes in getting all the liquid to roll off into the bottom of the chamber. Thus the maximum amount of steam is generated in the steam generating chamber 43.

Upon generating the steam it is necessary that the steam generating chamber be closed to utilize the steam pressure to produce a steam jet. As aforementioned, the build-up of steam pressure in the steam chamber forces the valve upwardly to close the annular opening 46. For this purpose the base 48 of the valve is formed with a conical upper surface 52 so that the base will enter the opening to locate itself as well as seating in the opening to close the steam chamber. With this condition, as illustrated in Fig. 3, the steam will be forced up through the hollow stem 49 and out the orifices 53 in a steam jet of appreciable duration. As an incident of the upward movement of the valve, the stem 49 is projected up towards the bottom of the fountain tube 18, and by virtue of the conical surface 52 of the valve serving to locate the valve, the orifice will be positioned to direct the steam jet centrally of the fountain tube. Also, since the orifice has now been closely positioned to the mouth of the fountain tube 18, the energy of the steam will be efficiently utilized.

The water is drawn up the fountain tube 18 for infusion through the coffee by the steam jet working on the principle of a steam injection pump. The liquid surrounding the stem 49 of the valve is drawn up the fountain tube and is immediately replaced by liquid from the chamber 11 flowing in through the spaces between the legs 54 which support the tube. During the steam injection operation the steam pressure in the steam chamber 43 drops, with the result that the valve 47 begins to drop back to the position shown in Fig. 2. As soon as the base 48 of the valve moves away from the top of the upper well portion 42 the annular opening 46 is freed and liquid begins to enter the steam chamber 43. This liquid is relatively cooler than the steam remaining in the steam chamber 42 and will act to condense that steam, since there will be insufficient steam remaining therein to evaporate the inflowing liquid. Condensation of the steam momentarily creates a partial vacuum in the steam chamber promoting the inflow of liquid to fill the same by sucking the liquid in through the annular opening 46 as well as through the hollow stem 49 of the valve 47, although the greatest part of the liquid enters through the annular opening. Upon the steam generating chamber 43 again becoming full of liquid the steam generating process is repeated followed by injection of the steam into the fountain tube to draw the liquid up the tube for infusion through the coffee. The jet of steam enters the fountain tube 18 and causes the liquid to be drawn up through the tube to a fountain in cap 13 from whence it flows down through the coffee bed and coffee holder by gravity and after infusion flows back into chamber 11. The increased temperature of the liquid enables the steam to enter the fountain tube without condensation by the liquid. The steam does condense somewhere in the tube and heats the liquid in the tube so that it is delivered to the coffee holder at a temperature in the range of 180° to 195° F.

It will be understood that the liquid in chamber 11 must be heated sufficiently slowly by controlled applied heat that sufficient time is allowed for repeated circulation by steam in the manner explained through the coffee holder that a brew of proper strength is obtained. The heating means employed must be such as to heat the liquid chamber 11 gradually while intensely heating the steam generator. The particular heating unit previously described is merely illustrative. Other single, or separate heating units for the liquid chamber and steam chamber may be employed, and likewise other thermostatic timers and electric circuits.

The liquid circulating operation will not be continued indefinitely, but will terminate when the liquid in the liquid chamber 11 reaches a temperature of about 190° to 195° F. In this temperature range, the steam chamber, the valve and the surrounding areas will become so hot as to boil the liquid in these areas. When this condition is reached, the steam pressure on top of the valve will equal the steam pressure tending to force the valve up, with the result that the valve will not function in the previously described manner and the liquid circulating mechanism will fail. However, the thermostatic timing switch is preferably adjusted to open and reduce the heating effect of the heating element and heating plate at about the temperature at which steam failure may occur so as to avoid possible injury to the steam generator parts by the heat used during steam generation.

An important further feature of the invention is that while jets of steam are delivered from the steam generator intermittently, I can obtain continuous delivery of liquid through the fountain tube for infusion in the coffee holder. This I accomplish by making the fountain tube in whole or in part of substantially smaller interior diameter than is conventional. It may have a restricted bore of, say, around ⅛" for its entire length or it may be provided with a local restriction at or adjacent its lower end. The latter arrangement is shown in Figs. 1, 2 and 3. A venturi 56 is provided at the lower end of the fountain tube sufficiently close to the orifice of the steam generator that steam jets enter the venturi with considerable force during the normal liquid circulating period. The bore of the venturi at its smallest point will be smaller than where the tube is of small diameter throughout its length but should be considerably larger than the size of the orifice to insure adequate circulation of liquid with the steam through the venturi. With an orifice of the size previously referred to I used a tube having a minimum bore of 0.108" with very satisfactory results. The diameter of the fountain tube above the venturi was in some instances ³⁄₁₆" and in other instances ¼", both of which sizes are conventional.

It now appears that the continuous circulation of liquid through the fountain tube to the coffee holder is due to dampening or flow retarding effects of the venturi on the jets of steam on the circulated liquid. Because of the retardation of flow the liquid in chamber 11 surrounding the fountain tube at and immediately above the venturi probably causes the steam to condense and lose its force immediately above, and perhaps starting in the venturi. In any event a relatively smooth flow of liquid is discharged from the upper end of the tube.

Where a fountain tube is of restricted diameter throughout its length or throughout any substantial portion thereof, a similar flow retarding action would be obtained. In either construction the degree of flow restriction provided by the fountain tube must be determined by the liquid circulating capacity of the steam operator.

The invention as described produces adequate repeated circulation of liquid from chamber 11 through the coffee bed in the coffee holder to provide a brew of any normal strength as the liquid rises in temperature from around 160° to around 180° to 190° F. and before the steam generator would become inoperative to further generate steam. Adjustment of screw actuator 33 of the thermostatic timing switch will determine the temperature at which the thermostatic arm 32 opens the switch, the length of the overall heating period and the length of the circulating period which follows initial heating. The brew obtained is of excellent taste since infusing the liquid at below boiling temperature avoids extraction from coffee of various bitter taste components which are extracted when the liquid is infused at boiling temperature.

The invention as described heretofore will operate quite satisfactorily to produce coffee. However, the generation of the steam and the circulation of the water by the steam jet creates a certain amount of vibration in the system resulting in objectionable noise. Accordingly, as an additional feature of the invention a silencer bell 57 is provided. The bell 57 is hemispherical in shape with a neck that fits the outside of the fountain tube 18. The silencer bell is positioned adjacent the bottom of the fountain tube and sits on the outwardly flaired legs 54. The hemispherical shape of the bell precludes interference thereof with the normal coffee making operation, and the element 57 being relatively heavy, deadens the vibrations of the steam generating parts and the fountain tube, thereby eliminating the objectionable noise.

While I prefer to provide continuous circulation of liquid to be infused through the grounds in the coffee maker this is not essential to satisfactory infusion. It is also within the scope of the invention to circulate the liquid intermittently by the intermittent bursts of steam from the steam chamber. The steam generator can be constructed to function as before. Since continuous flow is produced by restriction of flow in the fountain tube, intermittent flow of liquid for infusion can be obtained merely by employing a fountain tube of sufficiently large interior diameter throughout its length that the steam and liquid injected into the tube flow upwardly through the tube without substantial restriction under force of the steam. Since the bursts of steam are of very short duration, only a limited quantity of liquid is delivered to the coffee holder through the tube with each burst. However, because of the lack of restriction the rate of flow through the tube is more rapid and it has been found that substantially the same total volume of liquid can be circulated through the coffee holder during brewing period and a brew of equal strength obtained as with the embodiments which provided continuous liquid circulation.

It will be understood that the embodiments of the invention which have been described are merely illustrative. The construction and dimensions of the steam generator and associated parts can be varied considerably within the scope of the invention and glass in place of metal parts may be employed wherever possible. The invention is novel in construction and operating principle and differs materially from prior devices. Accordingly the scope of the invention is to be determined from the appended claims.

I claim:

1. In a recirculating coffee maker or the like having a heating element adapted to operate to discharge heat continuously during the course of a coffee making operation, a fountain tube adapted to be immersed in the infusing liquid at its inlet end and to be in communication therewith, a pump comprising a steam generating chamber adapted to be immersed in the liquid and having a port for inlet of liquid, said tube and pump being connected to each other in alignment whereby the pump discharges steam into the inlet of the tube, and an intermittantly operating valve for said port having an open ended hollow stem loosely and freely mounted in said port for multiple reciprocation therein in response to pressure changes while the heating element is operative to discharge heat whereby steam is produced in the course of a coffee making operation, there being an annular space between the outer surface of the stem and the inner surface of said port for inlet of liquid into the steam generating chamber, the hollow of said stem being restricted and constituting a restricted passageway in alignment with said inlet end of said fountain tube for discharging of steam into the inlet end of said fountain tube to elevate infusing liquid through the tube, said valve having means thereon operative to completely close said steam generating chamber except for said restricted passageway.

2. A pump as set forth in claim 1 wherein the valve has a base for port closure, and said base is a conical element having a funnel like interior on the side remote from said port to facilitate movement thereof toward the port upon rapid generation of steam, and being tapered exteriorily on the side adjacent the port to facilitate seating.

3. A pump as set forth in claim 1 wherein the steam generating chamber is formed of separable sections, one of which is removable whereby the user can readily rinse the same.

4. A pump as set forth in claim 1 wherein the steam outlet passage is relatively highly restricted adjacent the fountain tube to provide a jet.

5. A pump as set forth in claim 1 having a weighted silencer bell supported on the tube adjacent the lower end thereof, said bell surrounding the tube, to deaden the vibration and reduce the noise accompanying the generation of steam and infusion of liquid.

6. A coffee maker comprising a container having a fountain tube therein for conducting hot water upwardly within said container to a coffee basket and connected at its lower end with said container, a steam generator for impelling steam upwardly through said tube comprising a steam chamber disposed below the inlet end of said tube, and connecting thereto, a heat source in contact with said steam generator for evaporating water in said chamber, said chamber having a port at the top thereof, a valve head disposed in said chamber for closing of said port and provided with a highly restricted outlet orifice disposed in alignment with the inlet end of said tube to direct intermittent jets of steam into said tube, said valve head having a stem loosely fitting said port so as to permit passage of water from said container downwardly through said port into said steam chamber, said stem being reciprocal in said port, and serving to guide said valve to and from said port for intermittent closing thereof, said valve head having means on its lower end for receiving impingement of steam thereagainst to effect motion of said valve head for closing said port.

7. A coffee maker as set forth in claim 6, wherein said valve head is suspended from said valve stem, means for limiting downward gravitational motion of said valve head comprising an element carried by said valve stem and engageable with an exterior surface of said top of said steam chamber.

References Cited in the file of this patent

UNITED STATES PATENTS

| | | |
|---|---|---|
| 520,039 | Dunlap | May 22, 1894 |
| 850,709 | Wojidkow | Apr. 16, 1907 |
| 868,187 | Ives | Oct. 15, 1907 |
| 1,047,402 | Geftner | Dec. 17, 1912 |
| 1,492,160 | Colby | Apr. 29, 1924 |
| 1,916,228 | Lucia | July 4, 1933 |
| 2,025,302 | Olds | Dec. 24, 1935 |
| 2,175,727 | Graham | Oct. 10, 1939 |
| 2,385,132 | Graham | Sept. 18, 1945 |
| 2,658,134 | Kircher | Nov. 3, 1953 |